(12) United States Patent
Sauermann et al.

(10) Patent No.: US 8,419,576 B2
(45) Date of Patent: Apr. 16, 2013

(54) TENSIONER FOR A TRACTION MEANS SUCH AS A BELT OR THE LIKE

(75) Inventors: Diethard Sauermann, Bubenreuth (DE); Matthias Schmidl, Eckental (DE); Joerg Kaiser, Lonnerstadt (DE); Stefan Mack, Erlangen (DE); Arne Borchert, Winkelhaid (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 525 days.

(21) Appl. No.: 12/392,172

(22) Filed: Feb. 25, 2009

(65) Prior Publication Data

US 2009/0215563 A1 Aug. 27, 2009

(30) Foreign Application Priority Data

Feb. 26, 2008 (DE) .......................... 10 2008 011 074

(51) Int. Cl.
*F16H 7/12* (2006.01)
(52) U.S. Cl.
USPC .......................................................... 474/135

(58) Field of Classification Search .................. 474/101, 474/135, 138
See application file for complete search history.

(56) References Cited

U.S. PATENT DOCUMENTS

| | | | | |
|---|---|---|---|---|
| 3,272,496 | A * | 9/1966 | Halopoff et al. | 267/74 |
| 4,498,296 | A * | 2/1985 | Dijkstra et al. | 60/521 |
| 4,973,290 | A * | 11/1990 | Hans et al. | 474/117 |
| 4,976,661 | A * | 12/1990 | Ojima | 474/138 |
| 2005/0003915 | A1* | 1/2005 | Dec | 474/135 |
| 2006/0287146 | A1* | 12/2006 | McVicar et al. | 474/109 |

* cited by examiner

*Primary Examiner* — Thomas B Will
*Assistant Examiner* — Mai Nguyen
(74) *Attorney, Agent, or Firm* — Volpe and Koenig, P.C.

(57) ABSTRACT

A tensioner for a belt, a chain or the like, which has a tensioning lever that is in operative connection with a helical spring, is pivotable about a fixed axis and on the tensioning lever a receptacle for a tensioning element that bears against the belt, chain or the like is arranged. The helical spring is held at its ends by spring receptacles with the helical spring being screwed to at least one of the spring receptacles. This construction ensures a reliable and easy-to-assemble connection between the helical spring and the spring receptacle is achieved.

17 Claims, 9 Drawing Sheets

TENSIONER FOR A TRACTION MEANS SUCH AS A BELT OR THE LIKE

This application claims the priority of DE 10 2008 011 074.4 filed Feb 26, 2008 which is incorporated by reference herein.

FIELD OF THE INVENTION

The invention relates to a tensioner for a traction means such as a belt, a chain or the like, having a tensioning lever which is in operative connection with a helical spring and is pivotable about a fixed axis and on which a tensioning element for bearing against the traction means to be tensioned is provided, the helical spring being held at its ends by spring receptacles.

BACKGROUND OF THE INVENTION

Tensioners of the generic type are also used for drive or timing belts in motor vehicles and are always to ensure satisfactory functioning and transmission of the belt force without slip or without disturbing vibrations of the belt by ensuring an optimum belt tension even during aging of the belt. In addition, the connection between the helical spring and spring receptacles, at the axial ends of the tensioner is to be captively locked during transport of the same and is to be sufficiently secure during dynamic operation. In a tensioner known from DE 195 01 685 C1, the helical spring is merely slipped loosely onto the spring receptacles, which does not ensure captive locking. In addition, said helical spring, in the state as delivered to an assembly site, can buckle laterally, which, for quick and reliable assembly, is to be avoided. Furthermore, it is desirable in such tensioners that, if the traction means breaks and the helical spring consequently relaxes (snapping), said tensioners can utilize a soft snapping end stop in order to reliably avoid destruction of the tensioner in such a case.

OBJECT OF THE INVENTION

The object of the invention is therefore to present a tensioner of the generic type in which a captively locked connection between the helical spring and the spring receptacles at the axial ends is realized and which reliably avoids self-destruction on account of a soft end stop in said case of the snapping of the tensioner. In addition, the novel tensioner is to be designed in such a way that undesirable lateral buckling of the spring does not take place during transport and operation.

SUMMARY OF THE INVENTION

The invention is based on the knowledge that the ease of assembly and the reliability of a tensioner with regard to said technical problems is greatly influenced by the type of connection between the helical spring and the respective spring receptacle. To achieve the object, the invention therefore proceeds, according to the features of claim 1, from a tensioner for a traction means such as a belt, a chain or the like, having a tensioning lever which is in operative connection with a helical spring and is pivotable about a fixed axis and on which a receptacle for a tensioning element for bearing against the traction means to be tensioned is arranged, the helical spring being held at its ends by spring receptacles. In addition, provision is made according to the invention for the helical spring to be screwed to at least one of the spring receptacles.

This construction ensures that a reliable, easy-to-assemble and comparatively flexible connection between the helical spring and the spring receptacle is realized at this point of the tensioner, said connection reliably preventing self-destruction of the tensioner even if the traction means breaks and the helical spring consequently relaxes and is pushed apart. This connection is equally suitable for both tension springs and compression springs.

The subclaims describe preferred developments or configurations of the invention.

According to a first preferred development of the invention, provision is made for at least a region of the helical spring to have coils designed in such a way that screwing of the helical spring to at least one of the spring receptacles in the relieved state of the helical spring is facilitated. In this case, according to a further development of the invention, care should expediently be taken to ensure that at least one of the spring receptacles has suitable means for screwing the coils, wherein the pitch of the coils, at least in the screwing region, corresponds approximately to the pitch of the screwing means.

When a tension spring is used, provision should expediently be made for the coils of the helical spring to have a variable pitch. It is especially advantageous in this case if the pitch of the coils in the region of at least one end of the helical spring is increased relative to another coil region of the helical spring. Due to this construction, a tension spring can be screwed more easily to the spring receptacle at its ends.

A further advantageous development of the concept of the invention provides for at least one of the spring receptacles to have a first part which serves for fastening to a further machine part, wherein a second part extending right into the helical spring is integrally formed on the first part, and the screwing means are designed as groove-shaped recesses or bearing surfaces formed in the second part. In this way, a spring receptacle can be easily connected both to connecting parts, such as tensioning lever or engine, and to the helical spring.

It is advantageous if the helical spring is designed as a tension spring since a tension spring can be preassembled more easily and, due to the fact that the spring is stressed in tension, buckling of the same is very unlikely. Nonetheless, it may possibly be expedient (for example for safe transport) to provide means for preventing buckling of the helical spring. Said means may be designed, for example, as a sliding guide located inside the helical spring.

The risk of the tensioner being damaged by the tension spring if the belt breaks is also slight, unlike in the case of a compression spring, since the tension spring contracts if such a damaging event occurs.

A most expedient development of the invention provides for not only one spring receptacle but rather for both spring receptacles to be screwed to the helical spring. Therefore the fitting or the exchange of the unit consisting of spring receptacles and helical spring can be considerably simplified, since the unit is completely preassembled and can be simply slipped when required onto the tensioning lever (bearing pin) and then flanged for example.

It is also advantageous if one spring receptacle is rotatably connected to the tensioning lever, wherein the rotatability of the spring receptacle relative to the tensioning lever is expediently realized by a sliding bearing bushing which interacts with a bearing pin. By means of this design the helical spring is subjected to less load during operation and its loss of tension during the service life can be reduced. The other, axially opposite spring receptacle is in this case normally designed in such a way that it is connected to a fixed component in a rotationally fixed manner.

It is advantageous for the ease with which the helical spring can be produced if said helical spring is designed as a compression spring, since the coils, for permitting screwing to the spring receptacle, do not have to be designed to be variable as viewed over the spring length, as would be the case in a tension spring.

However, if a compression spring is used (at least in the case of inadequate safety against buckling), it is advantageous if, according to a further configuration of the invention, a means for preventing buckling of the helical spring is provided. Said means may advantageously be designed as a band-shaped element which, in its fitted position, surrounds the helical spring over a substantial part of its length for the period of its transport and its fitting at the point of use. In this case, means are expediently provided which prevent the band-shaped element from slipping off from its fitted position. As soon as the tensioner is assembled at the point of use, the band-shaped element is removed.

A further most advantageous development of the concept of the invention provides for a second spring receptacle for fastening to a machine part to be provided in addition to the spring receptacle rotatably connected to the tensioning lever, wherein the helical spring and the spring receptacles form a preassembly unit which is held under prestress by suitable means. Therefore the fitting or the exchange of the unit consisting of spring receptacles and helical spring can be considerably simplified, since the unit is completely preassembled and can be simply slipped when required onto the tensioning lever or its bearing pin and then flanged, for example, to the latter.

A prestress can be achieved in a simple manner from the design point of view if the prestressing means are designed as an elongated component which extends from one spring receptacle and which, at its end facing the other spring receptacle, can be brought into operative connection with the latter via suitable means. In this case, the means for producing an operative connection may advantageously be designed as latching means or in the form of cotter locking.

BRIEF DESCRIPTION OF THE DRAWINGS

The invention is explained in more detail below with reference to the attached drawing and three preferred exemplary embodiments. A first tensioner is depicted in FIGS. 1 to 4, a second tensioner is depicted in FIGS. 5 to 10 and a third tensioner is depicted in FIGS. 11 to 14. In the drawing, in detail.

DETAILED DESCRIPTION OF THE DRAWINGS

Figure 1:
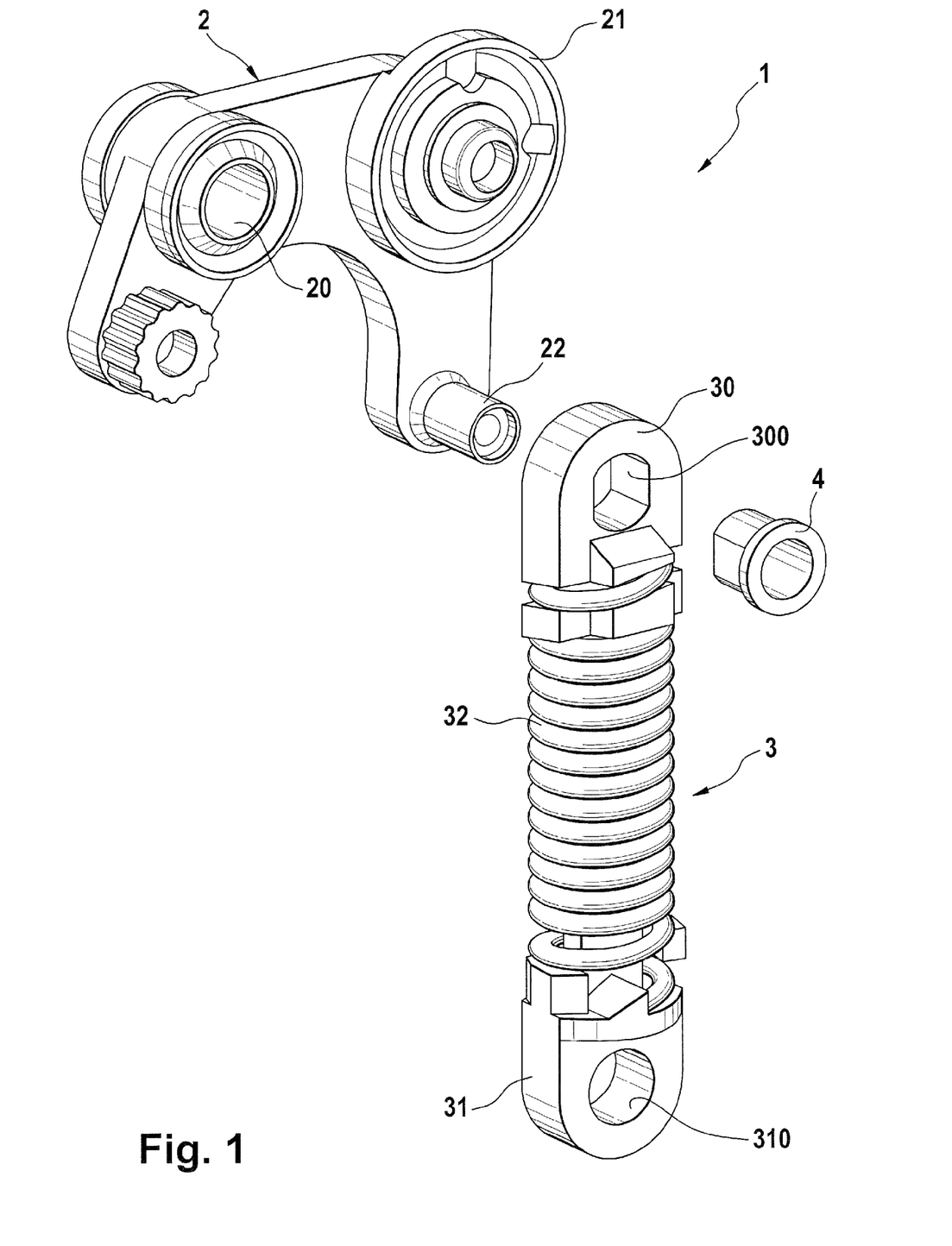
FIG. 1 shows an exploded illustration of a first tensioner according to the invention.

Reference is first of all made to FIG. 1. Shown there is a tensioner according to the invention which consists of the components: tensioning lever 2 and spring unit 3. The tensioning lever 2 is pivotally connected in a fixed position to a machine part (not shown in any more detail), for example an engine of a motor vehicle, by means of an opening 20 and has a receptacle 21 for a disk-shaped tensioning element which is rotatably connected to the tensioning lever 2 and serves to bear against a traction means (not shown), for example a belt.

The spring unit 3 comprises a helical spring 32 (in this case a tension spring) which is screwed at its ends to two spring receptacles 30, 31. In this case, it can be seen that the coils of the helical spring 32 have a variable pitch. As the Figures show, the pitch of the coils at the ends of the helical spring 32, to be precise in the screwing region, is greater than in the central region of the helical spring 32. As a result, the spring ends can be screwed more easily to the spring receptacles 30, 31.

The spring receptacle 30 has an opening 300 which is profiled at the circumference and accommodates in a rotationally fixed manner a bearing bushing 4 profiled in like manner. Together with the bearing bushing 4, the spring receptacle 30 can be pushed onto a bearing pin 22 connected to the tensioning lever 2 and the bearing pin 22 can be flanged onto the bearing bushing 4 by means of a flanged edge 220 (see FIG. 3). A reliable, rotatable connection between spring unit 3 and tensioning lever 2 is therefore ensured. The materials of the friction pair of bearing pin 22 and bearing bushing 4 can be matched to one another in an optimum manner. Instead of the bearing pin 22, a screw having a bearing sleeve can also be used. The spring receptacle 31 has a hole 310, by means of which the spring receptacle 31 can likewise be fixedly connected to a machine part (not shown in any more detail) via a threaded bolt. This connection may be designed to be rotationally fixed or else rotatable.

Figure 2:
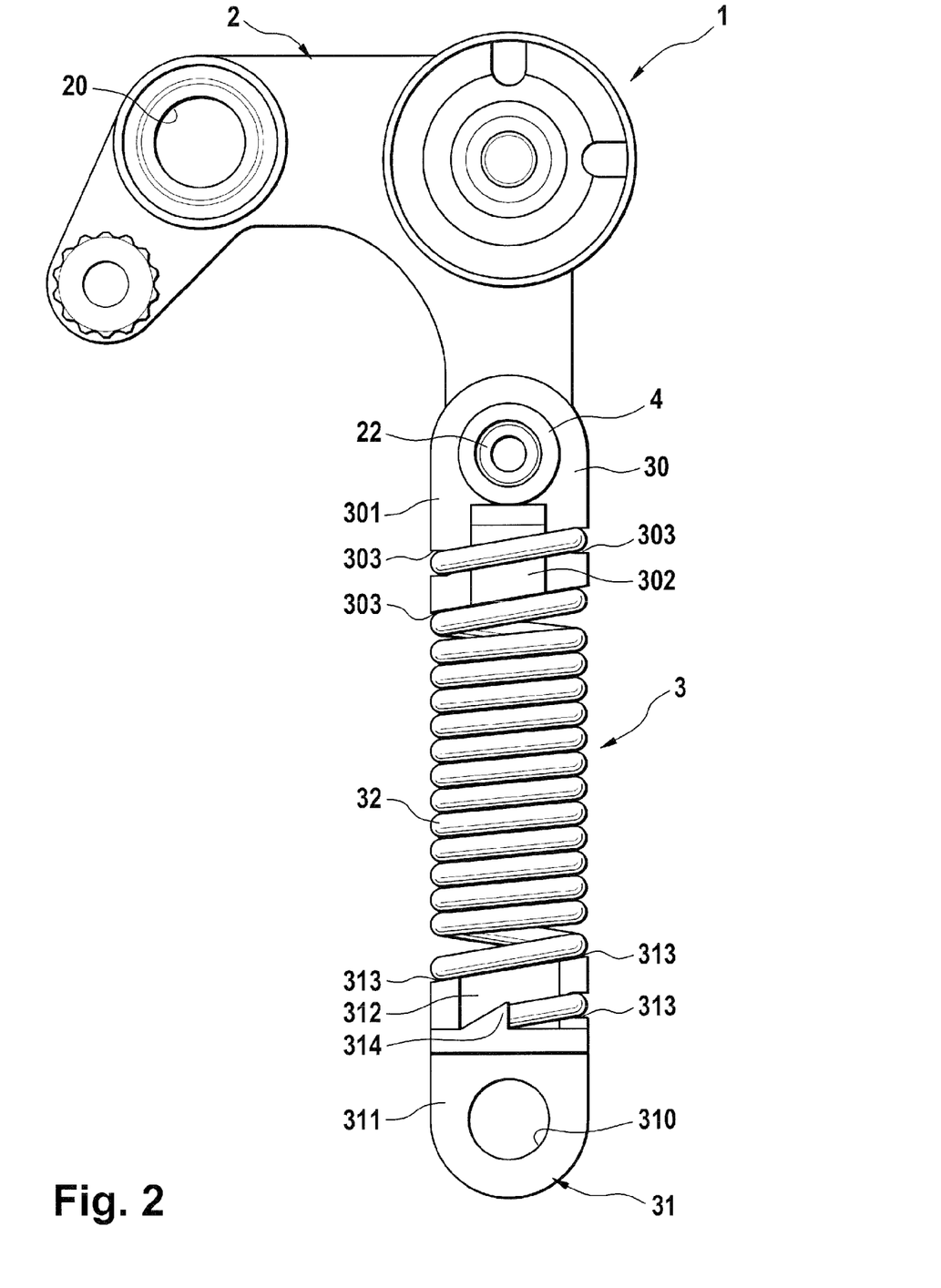
FIG. 2 shows a plan view of the tensioner according to FIG. 1 in the assembled state.
Figure 3:
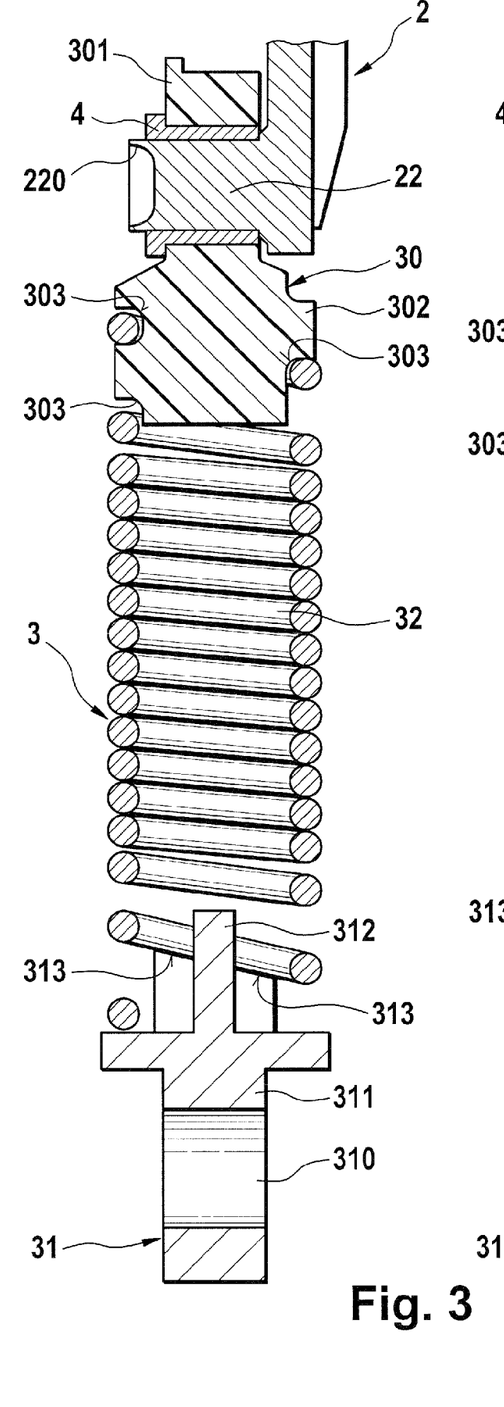
FIG. 3 shows a side view of the tensioner in the region of the helical spring in longitudinal section.

FIG. 2 shows a plan view of the assembled tensioner 1, and essentially the spring unit 3 connected to the tensioning lever 2 is shown in a sectional side view in FIG. 3. The spring receptacle 30 has a part 301 rotatably connected to the tensioning lever 2 and a part 302 which is screwed to the helical spring 32 and which is provided with thread-shaped grooves or bearing surfaces 303 (see FIG. 2 to FIG. 4).

The second spring receptacle 31 also has a part 311 provided with the hole 310 and a part 312 provided with thread-shaped grooves or bearing surfaces 313 (see FIG. 2 to FIG. 4) for the coils of the helical spring 32. A stop 314 for an end of the helical spring 32 can also be clearly seen, said stop 314 being integrally formed on the spring receptacle 31. Both spring receptacles 30, 31 have such stops. However, the helical spring 32 is not screwed in until it runs against the stop, since its ends move due to the loading and load-relief and therefore a little play is required. On account of the friction between the helical spring 32 and the spring receptacles 30, 31, certain damping of the movement is achieved. The thread-shaped grooves or bearing surfaces 303, 313 can be seen very effectively in FIG. 3 and FIG. 4. It becomes clear that the thread-shaped grooves or bearing surfaces 303, 313 have approximately the same pitch as the coils of the helical spring 32. Furthermore, the flanged edge 220 of the bearing pin 22, which can be flanged onto the bearing bushing 4, is shown in FIG. 3.

FIGS. 5 to 10 show a second exemplary embodiment of the tensioner 1' according to the invention which consists of the components: tensioning lever 2 and spring unit 3. The tensioning lever 2 is pivotally connected in a fixed position to a machine part (not shown in any more detail), for example an engine of a motor vehicle, by means of a threaded bolt passed through the opening 20 and has a receptacle 21 for a disk-shaped tensioning element which is rotatably connected to the tensioning lever 2 and serves to bear against a traction means (not shown), for example a belt.

Figure 5:
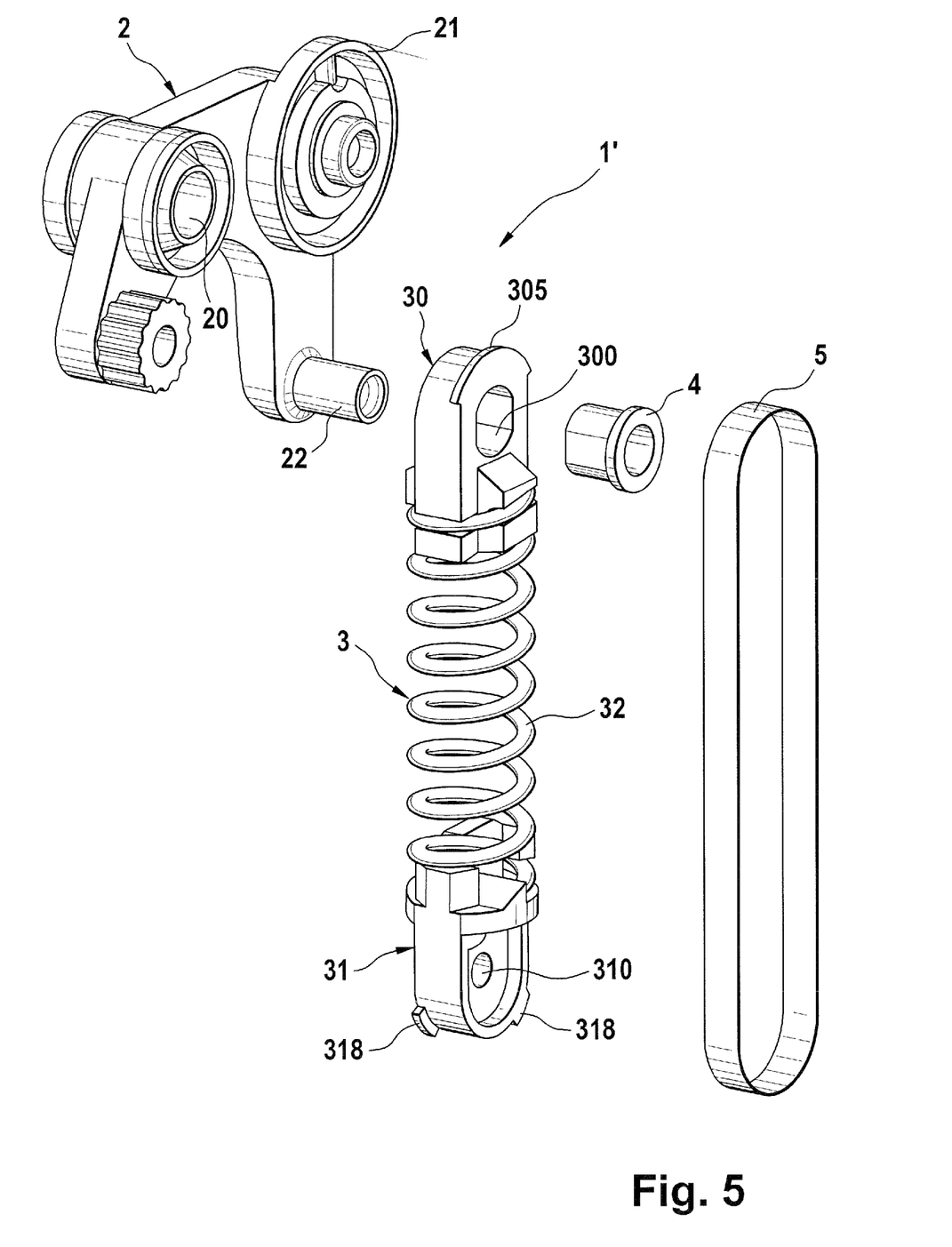
FIG. 5 shows an exploded illustration of a second tensioner according to the invention.

The spring unit 3 comprises a helical spring 32 (in this case a compression spring) which is screwed at its ends to two spring receptacles 30 and 31, respectively. The spring receptacle 30 has an opening 300 which is profiled at the circumference and accommodates in a rotationally fixed manner a bearing bushing 4 profiled in like manner. Together with the bearing bushing 4, the spring receptacle 30 can be pushed onto a bearing pin 22 connected to the tensioning lever 2 and the bearing pin 22 can be flanged onto the bearing bushing 4 by means of a flanged edge 220 (see FIG. 9). A reliable, rotatable connection between the spring unit 3 and the tensioning lever 2 is therefore ensured. The materials of the friction pair of bearing pin 22 and bearing bushing 4 can be matched to one another in an optimum manner.

The spring receptacle 31 has a hole 310, by means of which the spring receptacle 31 can likewise be fixedly connected to a machine part (not shown in any more detail). Also shown is a safety band 5 which is designed to be elastic with respect to the normal spring travel and which can be pulled over the spring unit 3 and serves as an anti-buckling means for the compression spring 32 during the transport and the assembly of the tensioner at the point of use. The two spring receptacles 30, 31 are provided with suitable slip guards 305 and 318, respectively, for the safety band 5, said slip guards 305 and 318 being designed as curved axial webs and forming at least one locating groove (see spring receptacle 31) for the safety band 5.

Figure 6:
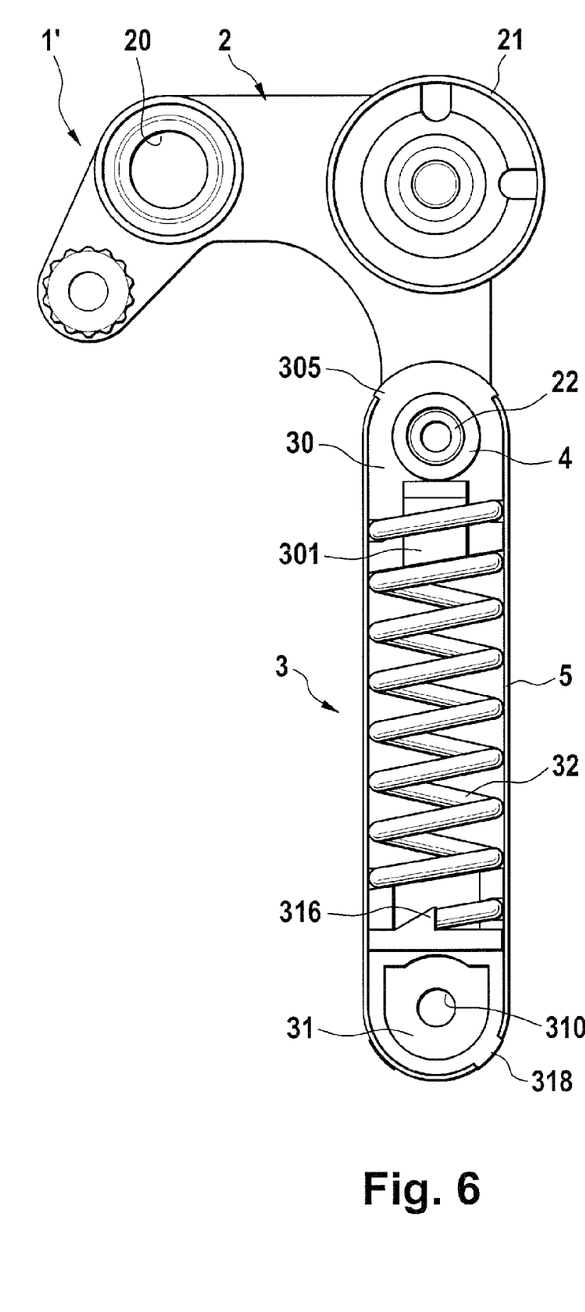
FIG. 6 shows a plan view of the tensioner according to FIG. 5 in the assembled state.
Figure 7:
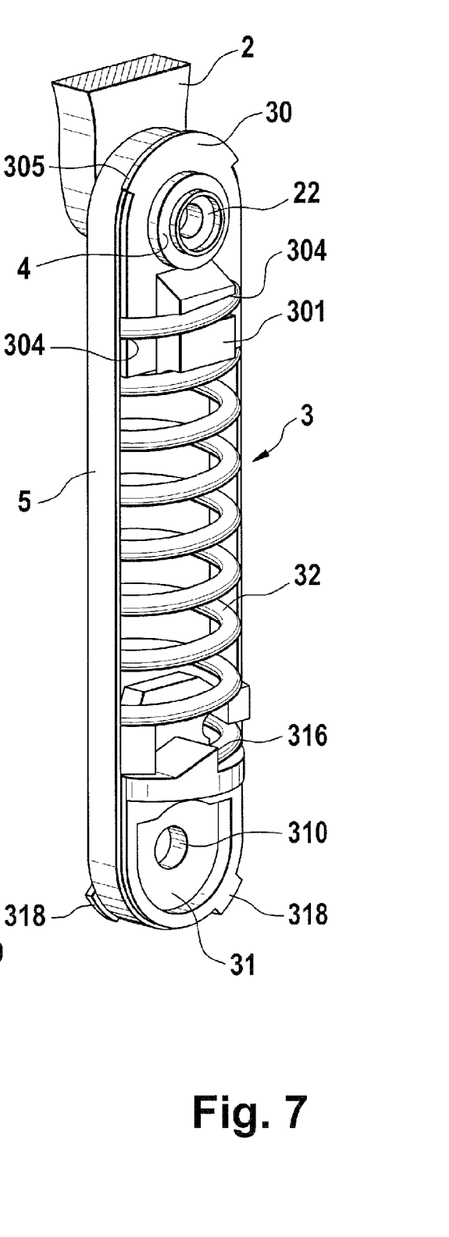
FIG. 7 shows a perspective illustration of the tensioner according to FIG. 5 in the region of the helical spring.

FIG. 6 shows a plan view of the assembled tensioner 1' and essentially the spring unit 3 connected to the tensioning lever 2 is shown in FIG. 7. The top spring receptacle 30 has a part 301 which is screwed to the helical spring 32 and which is provided with thread-shaped grooves or bearing surfaces 304. The bottom spring receptacle 31 also has thread-shaped grooves or bearing surfaces 315 (see FIG. 8) for the coils of the helical spring 32. A stop 316 for an end of the helical spring 32 can also be clearly seen, said stop 316 being integrally formed on the spring receptacle 31. Both spring receptacles 30, 31 have such stops. However, the helical spring 32 is not screwed in until it runs against the stop, since its ends move due to the loading and load-relief and therefore a little play is required. On account of the friction between the helical spring 32 and the spring receptacles 30, 31, certain damping of the movement is achieved.

Figure 8:
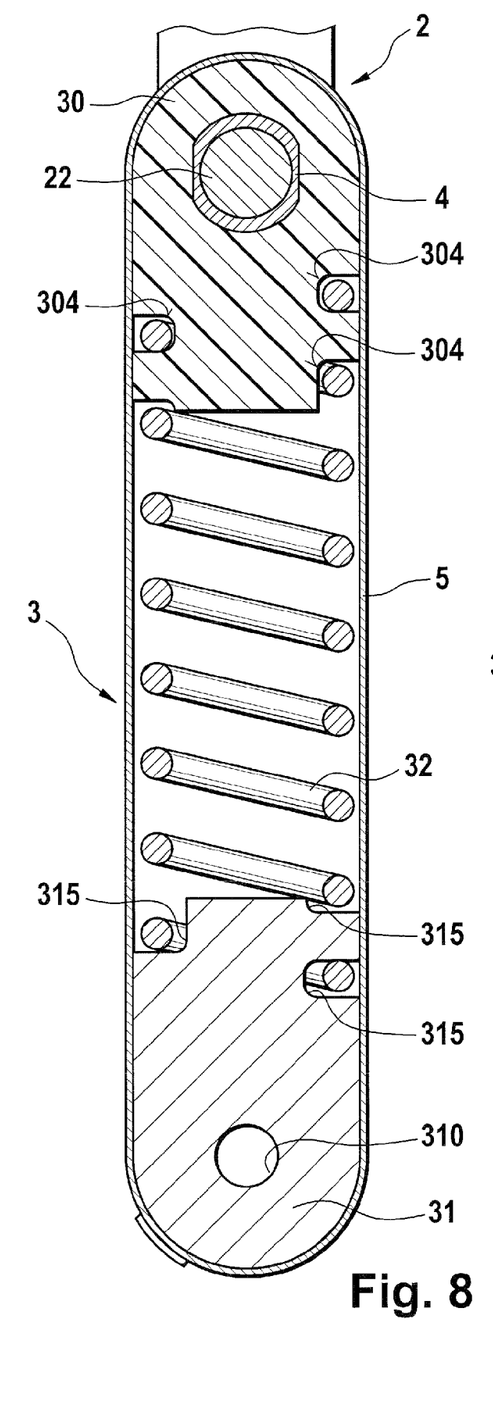
FIG. 8 shows a plan view of the tensioner according to FIG. 5 in the region of the helical spring in longitudinal section.
Figure 9:
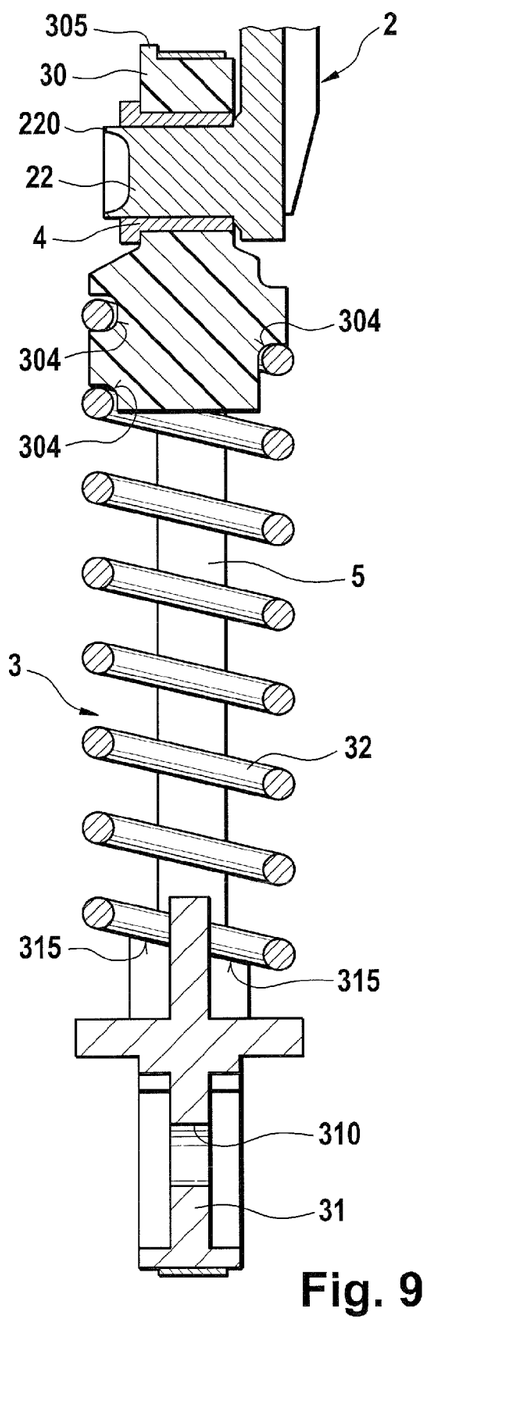
FIG. 9 shows a side view of the tensioner according to FIG. 5 in the region of the helical spring in longitudinal section.

The thread-shaped grooves or bearing surfaces 304 and 315, respectively, can be seen very effectively in FIG. 8 and FIG. 9. It becomes clear that the thread-shaped grooves or bearing surfaces 304 and 315 have approximately the same pitch as the coils of the helical spring 32. Furthermore, a flanged edge 220 of the bearing pin 22, which can be flanged onto the bearing bushing 4, is depicted in FIG. 9.

Figure 4:
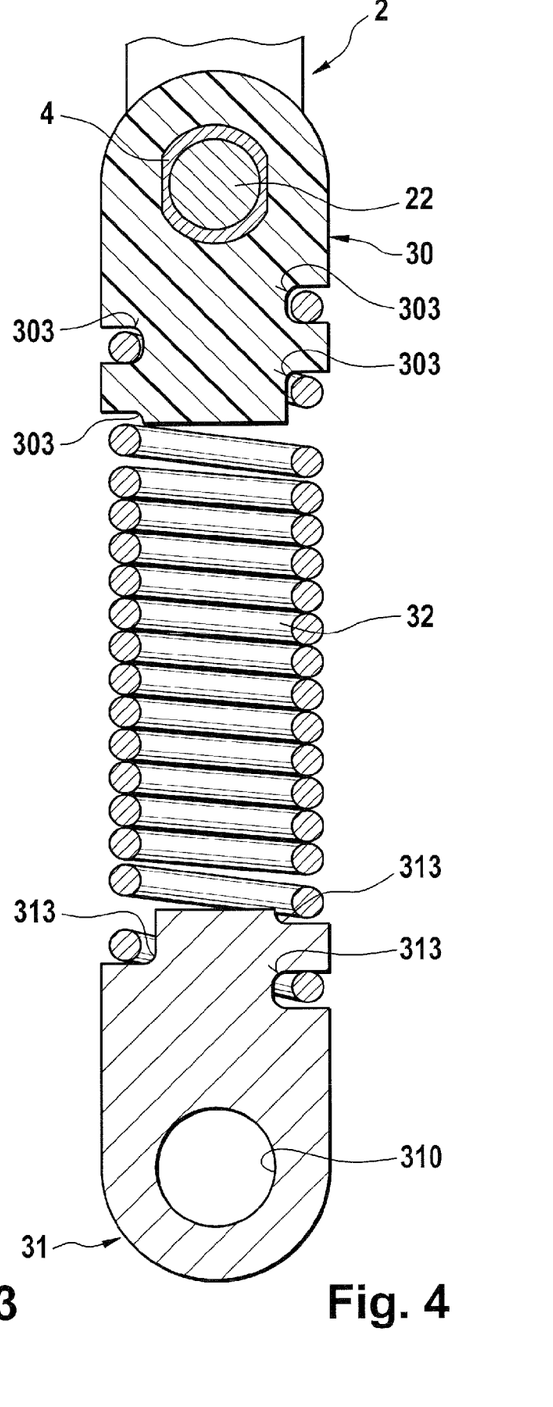
FIG. 4 shows a plan view of the tensioner in the region of the helical spring in longitudinal section.
Figure 10:
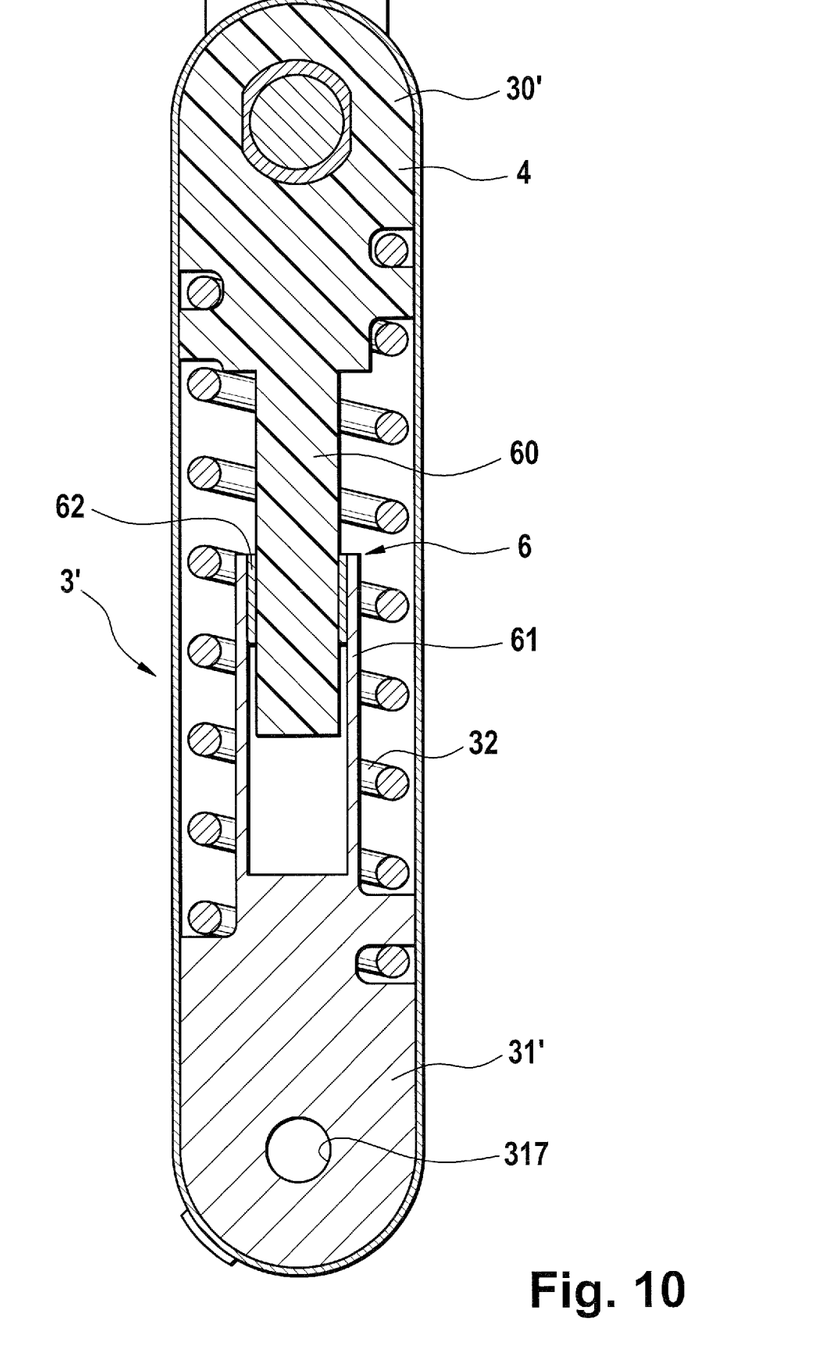
FIG. 10 shows a plan view of a further embodiment of the tensioner in the region of the helical spring having an antibuckling means in longitudinal section.
Figure 11:
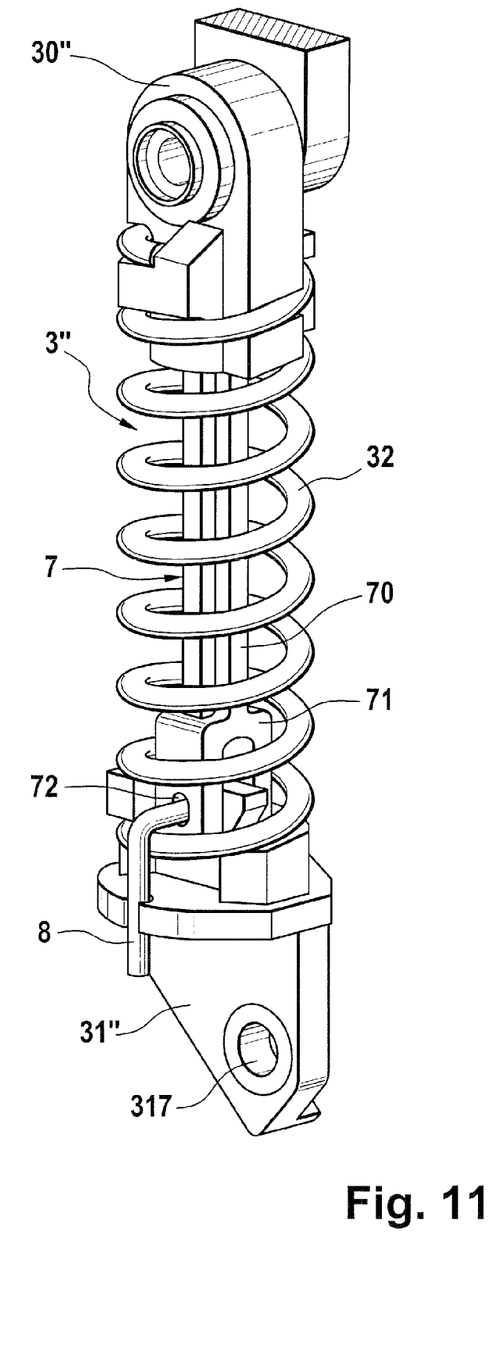
FIG. 11 shows a perspective illustration of a third embodiment of a tensioner according to the invention in the region of the helical spring having a prestressing unit.
Figure 12:
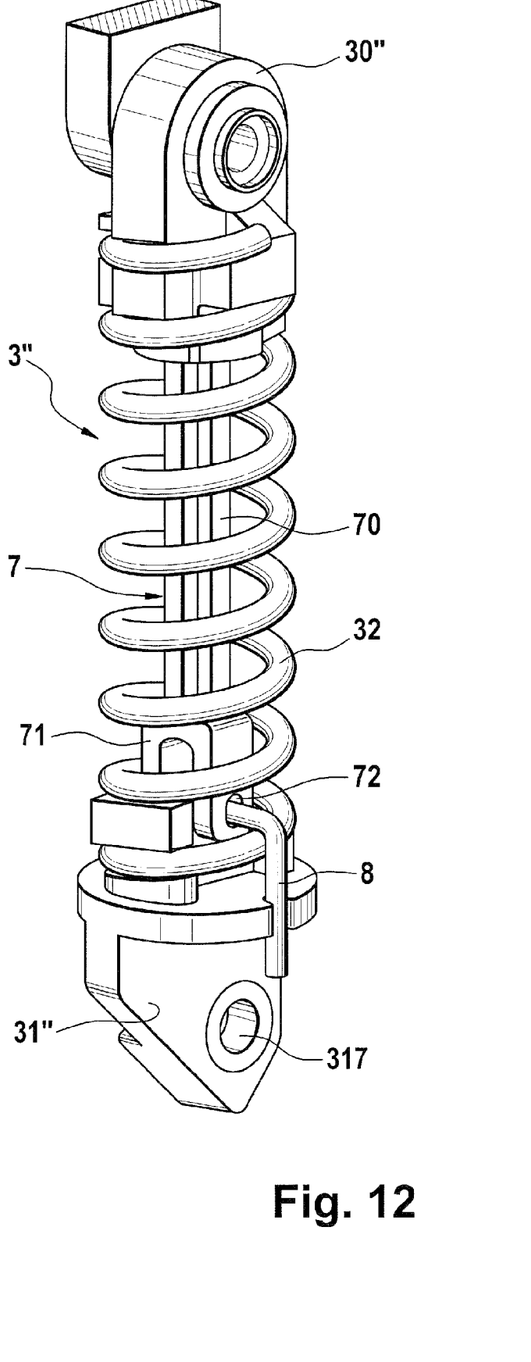
FIG. 12 shows another perspective illustration of the tensioner according to FIG. 11.

FIG. 10 shows an alternative, third spring unit 3' in which, in contrast to FIG. 4, an anti-buckling means 6 is arranged radially inside the cavity formed by the helical spring 32. The anti-buckling means 6 consists of a rod-shaped part 60 which can be pushed at least partly into a hollow part 61. To ensure a low-friction, exact guidance, a sleeve-shaped part 62 having favorable sliding properties is arranged between part 60 and part 61. The spring unit 3' has modified spring receptacles 30', 31', on which the parts 60 and 61, respectively, are integrally formed. The spring unit 3' can be fastened in any desired position to a tensioning lever or to a fixed element, since it permits a rotatable mounting axially on both sides. However, the spring unit 3' can also be locked in a rotationally fixed manner to a fixed machine part via the hole 317 for pivot locking.

Finally, FIGS. 11 to 14 show a further alternative embodiment of a spring unit 3" having modified spring receptacles 30" and 31". The top spring unit 3" is provided with an axially acting prestressing means 7 radially inside the helical spring 32. The prestressing means 7 consists of a rod-shaped part 70 integrally formed on the spring receptacle 30" and having a fork-shaped end 71 which overlaps an axial end of the bottom spring receptacle 31", in which a hole 317 (see FIG. 10) is incorporated. In addition, the legs of the fork-shaped end 71 are provided with through-holes 72 in alignment with one another. A locking cotter 8 is passed through the through-holes 72 and the hole 317 and therefore ensures a prestress of the spring unit 3". In this case, the spring receptacle 30" can be fastened to a tensioning element 2 in a rotatable or pivotable manner, whereas the axially opposite spring receptacle 31" can be rotatably connected with its hole 317 to a fixed machine element or can be connected to the latter in a rotationally fixed manner by means of the locking cotter 8.

Figure 13:
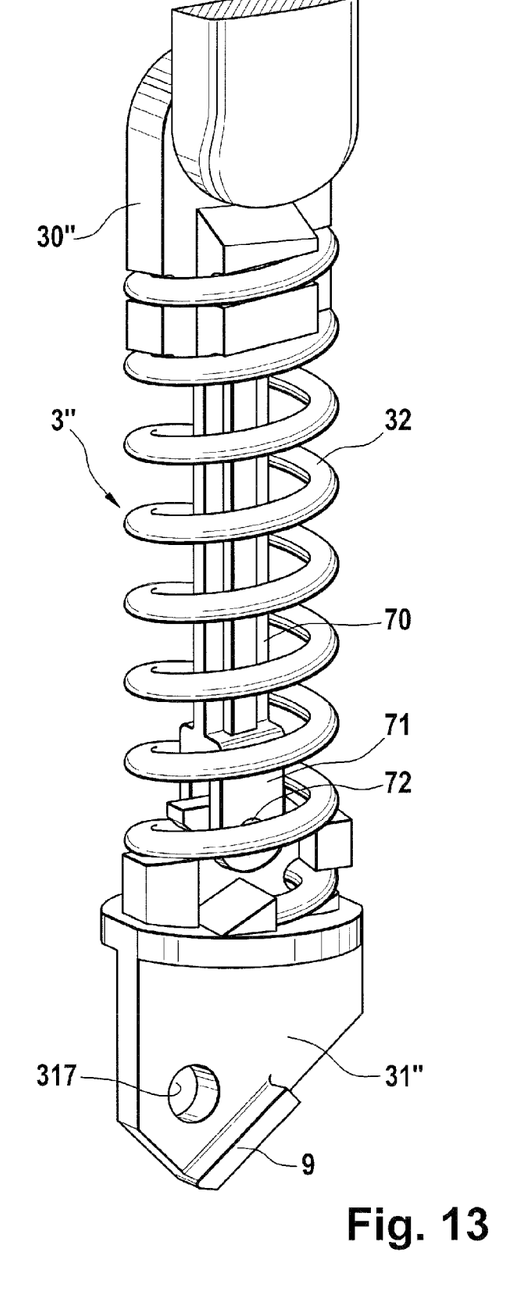
FIG. 13 shows a further perspective illustration of the tensioner according to FIG. 11.
Figure 14:
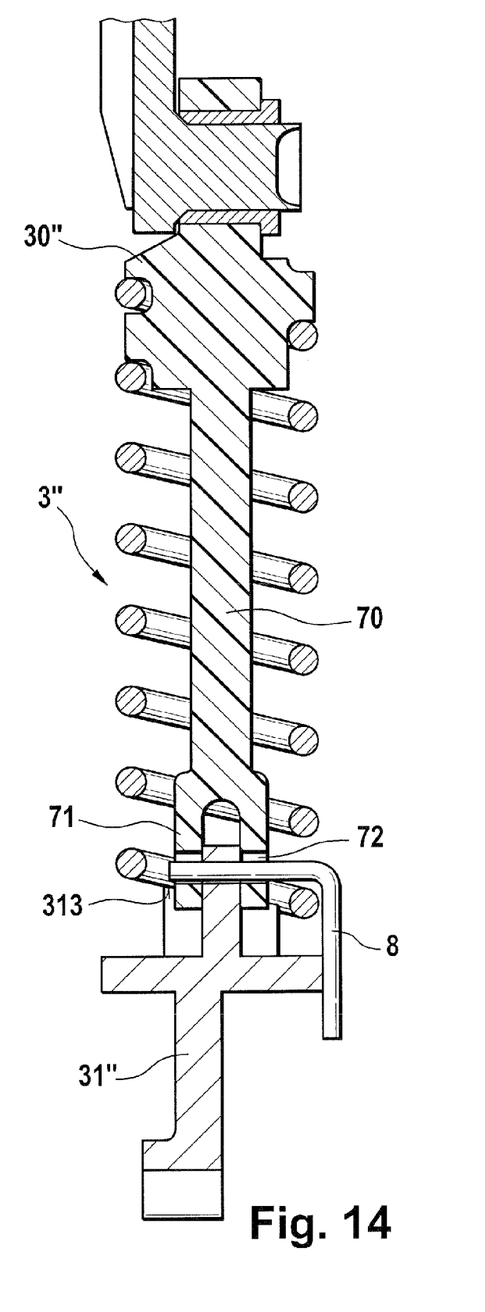
FIG. 14 shows a side view of the tensioner according to FIG. 11 in longitudinal section.

Finally, FIG. 13 in particular shows that an anti-rotation locking means 9 in the form of laterally projecting part is formed on the spring receptacle 31" remote from the tensioning roller in the region of its axial end, preferably to the side of and below the hole 317, which part, in the assembled state, bears against the fixed machine part, preferably in such a way as to be flush with the surface, and prevents the spring unit 3" from rotating during operation.

LIST OF DESIGNATIONS 1, 1', 1" Tensioner
2 Tensioning lever
20 Opening
21 Receptacle for tensioning element
22 Bearing pin
220 Flanged edge
3, 3", 3" Spring unit
30, 30', 30" Spring receptacle
300 Opening
301 Part of the spring receptacle
302 Part of the spring receptacle
303 Thread-shaped grooves or bearing surfaces
304 Thread-shaped grooves or bearing surfaces
305 Slip guard
31, 31', 31" Spring receptacle
310 Hole
311 Part of the spring receptacle
312 Part of the spring receptacle
313 Thread-shaped grooves or bearing surfaces
314 Stop
315 Thread-shaped grooves or bearing surfaces 316 Stop
317 Hole
318 Slip guard
32 Helical spring
4 Bearing bushing
5 Safety band
6 Anti-buckling means
60 Rod-shaped part
61 Hollow part
62 Sleeve-shaped part
7 Prestressing means
70 Rod-shaped part
71 Fork-shaped end
72 Through-holes
8 Locking cotter
9 Anti-rotation locking means on spring receptacle 31"

The invention claimed is:

1. A tensioner for a traction means having a tensioning lever which is in operative connection with a helical compression spring and is pivotable about a fixed axis and on which a receptacle for a tensioning element for hearing against the traction means to be tensioned is arranged, the helical spring, further comprising means for preventing buckling of the helical spring, said means including a band-shaped part which, in a fitted position, surrounds the helical spring over the length thereof by extending lengthwise on said tensioner around ends of said spring receptacles to counteract the compression generated by the spring.

2. The tensioner according to claim 1, Wherein the helical spring has coils configured to facilitate screwing of the helical spring to at least one of the spring receptacles in a relieved state of the helical spring.

3. The tensioner according to claim 1, wherein at least one of the spring receptacles has a screwing means for screwing coils of the helical spring, the pitch of the coils of the helical spring, at least in a screwing region, corresponds approximately to the pitch of the screwing means.

4. The tensioner according to claim 1, wherein coils of the helical spring have a variable pitch.

5. The tensioner according to claim 1, wherein the pitch of coils of the helical spring in a region of at least one end of the helical spring is increased relative to another coil region of the helical spring.

6. The tensioner according to claim 3, wherein at least one of the spring receptacles has a first part which serves for fastening to the tensioning lever and a second part, integrally formed on the first part and extending into the helical spring, the screwing means including groove-shaped recesses or bearing surfaces formed in the second part.

7. The tensioner according to claim 1, further comprising additional means for preventing buckling of the helical spring, said additional means including sliding guide located inside the helical spring.

8. The tensioner according to claim 1, wherein both spring receptacles are screwed to the helical spring.

9. The tensioner according to claim 1, wherein one spring receptacle is rotatably connected to the tensioning lever.

10. The tensioner according to claim 9, wherein the rotatability of the spring receptacle relative to the tensioning lever is realized by a sliding bearing bushing which interacts with a bearing pin.

11. The tensioner according to claim 10, wherein the sliding bearing bushing is held in a rotationally locked manner in the spring receptacle accommodating the sliding bearing bushing.

12. The tensioner according to claim 1, wherein a slip guard is provided to prevent the band-shaped part from slipping off from the fitted position.

13. The tensioner according to claim 1, wherein the helical spring and the spring receptacles form a preassembly unit which is held under prestress by prestressing means.

14. The tensioner according to claim 13, wherein the prestressing means includes an elongated component which extends from one spring receptacle and which, at an end facing another spring receptacle, can be brought into operative connection with the another spring receptacle.

15. The tensioner according to claim 14, Wherein latching means or a locking cotter provides the operative connection between the elongated component and the another spring receptacle.

16. The tensioner according to claim 1, wherein the helical spring and the spring receptacles form a spring unit, and an anti-rotation locking means formed as a laterally projecting part is formed in an axial end region, remote from a tensioning roller, of the spring receptacle, which projecting part, in an assembled state, bears against a fixed machine part and prevents the spring unit from rotating during operation.

17. A tensioner for a traction means having a tensioning lever which is in operative connection with a helical compression spring and is pivotable about a fixed axis and on which a receptacle for a tensioning element for bearing against the traction means to be tensioned is arranged, the helical spring being held at its ends by spring receptacles, *herein the helical spring is screwed to at least one of the spring receptacles, wherein the helical spring and the spring receptacles form a preassembly unit which is held under prestress by prestressing means, wherein the prestressing means includes an elongated component which extends from one spring receptacle and which, at an end facing another spring receptacle, can be brought into operative connection with the another spring receptacle, and wherein latching means or a locking cotter provides the operative connection between the elongated component and the another spring receptacle.

* * * * *